(12) United States Patent  
Makinouchi et al.

(10) Patent No.: US 7,277,115 B2  
(45) Date of Patent: Oct. 2, 2007

(54) COMMUNICATION TERMINAL DEVICE CAPABLE OF TRANSMITTING VISAGE INFORMATION

(75) Inventors: Takumi Makinouchi, Warabi (JP); Shinichi Murata, Warabi (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1090 days.

(21) Appl. No.: 10/330,351

(22) Filed: Dec. 30, 2002

(65) Prior Publication Data

US 2004/0204060 A1   Oct. 14, 2004

(30) Foreign Application Priority Data

Mar. 20, 2002   (JP)   ............................. 2002-077771

(51) Int. Cl.
   *H04N 7/14*   (2006.01)
(52) U.S. Cl. ................................. 348/14.01; 348/14.02
(58) Field of Classification Search .. 348/14.01–14.03, 348/14.07
   See application file for complete search history.

(56) References Cited

U.S. PATENT DOCUMENTS 5,426,460 A   6/1995   Erving et al.
6,307,948 B1 *   10/2001   Kawasaki et al. ....... 348/14.01
6,590,601 B2 *   7/2003   Sukeno et al. ........... 348/14.01
6,600,508 B2 *   7/2003   Nakade et al. ........... 348/14.09
6,965,413 B2 *   11/2005   Wada ...................... 348/14.02
2001/0052928 A1 *   12/2001   Imagawa et al. ........ 348/14.12

FOREIGN PATENT DOCUMENTS

WO   WO99/57900 A1   11/1999

* cited by examiner

Primary Examiner—Stella Woo
(74) Attorney, Agent, or Firm—Venable LLP; Michael A. Sartori; Catherine M. Voorhees

(57) ABSTRACT

A cellular phone has a signal processor, and the signal processor has a data selector. A first switch of the data selector selects either real face image data or three-dimensional character image data, thereby outputting the selected image data. A second switch of the data selector determines whether the real face image data should be introduced to a character visage extractor/synthesizer. The first switch is connected to a first terminal and the second switch is brought into an open (off) condition synchronously in response to a switch command. Alternatively the first switch is connected to a second terminal and the second switch is brought into a closed (on) condition in response to another switch command. The cellular phone can communicate with any types of conventional communication machines since the cellular phone sends either the real face image data or the character image data.

13 Claims, 6 Drawing Sheets

COMMUNICATION TERMINAL DEVICE CAPABLE OF TRANSMITTING VISAGE INFORMATION

BACKGROUND OF THE INVENTION

1. Field of the Invention

The present invention relates to a communication terminal device (e.g., mobile telephones and computers) which can transmit visage information to a remote party so as to improve communication services.

2. Description of the Related Art

Conventional telephones transmit a voice only. Image transmitting devices used in a videoconference can transmit a voice and image in realtime. Some recent mobile telephones (cellular phones) can transmit a voice and image in realtime.

As mobile telephones capable of sending an image in realtime increase in popularity, a problem of privacy arises because the transmitted image displays the (real) face of a user of the mobile telephone. Sometimes, the user of the mobile telephone does not want a recipient of the call to see the user's face. In order to minimize such a problem on one hand and to improve a communication function (including a function of transmitting an image, particularly visage of a speaker) on the other hand, various efforts have been made in this field of technology.

Conventional image transmitting devices are designed to operate with limited types of data. For instance, the image transmitting devices can transmit real image data (image without modification) only, or visage data (a somewhat modified face of a speaker) only. A data receiving device has a limited function to receive the real image data (or the visage data) only. The image transmitting device which can send only the real image data cannot communicate with the receiving device which can accept only the modified image data. The image transmitting device which can send only the modified image data cannot communicate with the receiving device which can only accept the real image data. In many cases, therefore, the conventional communication devices cannot communicate with each other.

SUMMARY OF THE INVENTION

An object of the present invention is to provide a communication terminal device which is able to send and receive a wide variety of image data.

According to one aspect of the present invention, there is provided a communication terminal device comprising: a capture unit for capturing first image data which includes a face image; an extractor for extracting characterizing portions from the face image to obtain visage information; an image synthesizer for modifying second image data, which is selected by a user of the communication terminal device, based on the visage information, thereby creating third image data; a data selector for selecting one of the first and third image data; a transmission unit for transmitting the selected image data to a remote party; and a transfer unit for transferring at least one of the first and third image data to an element of the communication terminal device.

The data selector selects either the first or third image data in accordance with determination made by the user of the communication terminal device, and the transmission unit sends the selected image data to the remote party. Therefore, the communication terminal device can communicate with a remote party that can only handle the first image data and with another type of remote party that can only handle the third image data.

DETAILED DESCRIPTION OF THE INVENTION

Embodiments of the present invention will be described with reference to the accompanying drawings.

Figure 1:
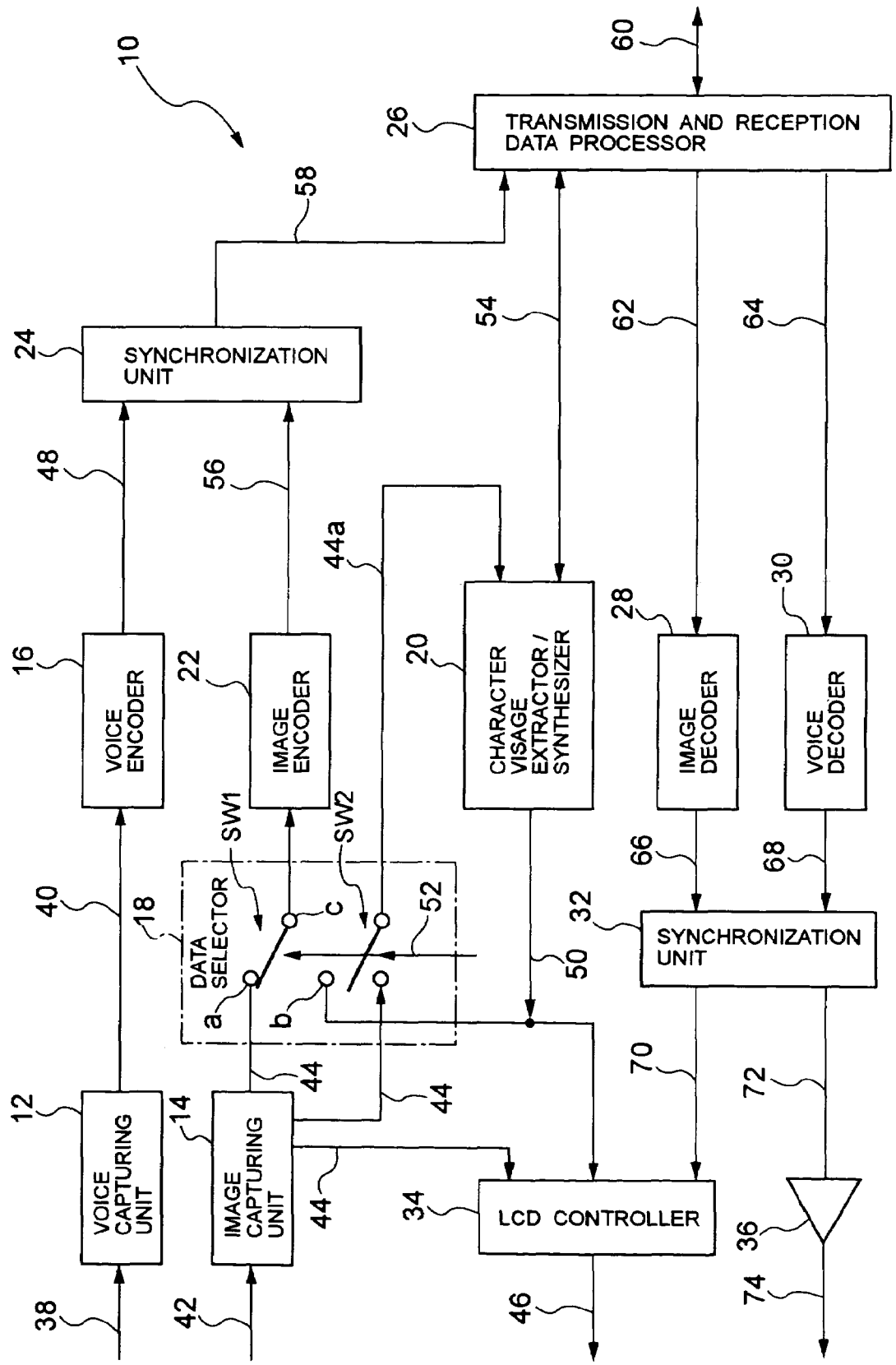
FIG. 1 illustrates a block diagram of a signal processing unit included in a cellular phone according to a first embodiment of the present invention.
Figure 3:
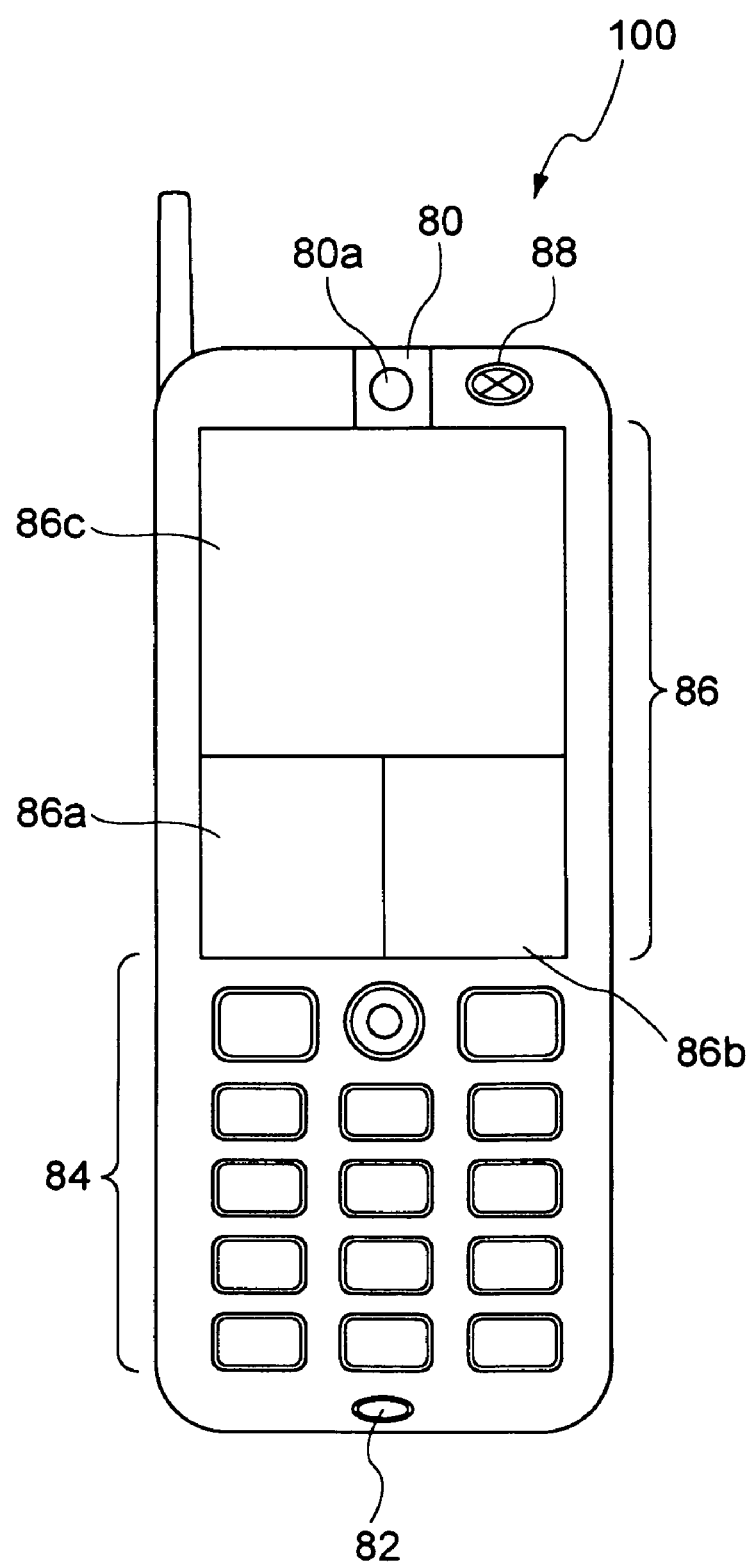
FIG. 3 illustrates a front view of the cellular phone shown in FIG. 1.

Referring to FIG. 1, a communication terminal device having a visage transmitting function according to a first embodiment is illustrated. In this embodiment, the communication terminal device is embodied in a signal processing unit 10 of a cellular phone 100 (FIG. 3). FIG. 1 shows the signal processing unit 10. It should be noted that a signal is represented by a reference numeral assigned to a line. For example, reference numeral 38 designates a signal on that line.

The signal processing unit 10 includes a voice (audio) capture unit 12 to capture the voice of the user of the cellular phone 100, an image (video) capture unit 14 to capture a real image of the user, a voice encoder 16, a data selector 18, a character visage extractor/synthesizer 20, an image encoder 22, a synchronization processor 24, a transmission and reception data processor 26, an image decoder 28, a voice decoder 30, a second synchronization processor 32, a LCD (liquid crystal display) controller 34 and an output amplifier 36. The voice capture unit 12, image capture unit 14, voice encoder 16, data selector 18, character visage extractor/synthesizer 20, image encoder 22, synchronization processor 24, transmission and reception data processor 26, and LCD controller 34 are used when transmitting a voice and image to a remote party. The character visage extractor/synthesizer 20, transmission and reception data processor 26, image decoder 28, voice decoder 30, second synchronization processor 32, LCD (liquid crystal display) controller 34 and output amplifier 36 are used when receiving a voice and image from the remote party.

An analog voice (audio) signal 38 is input to the voice capture unit 12 from a microphone 82 (FIG. 3). The voice capture unit 12 includes an A/D converter circuit (not shown) to convert the analog voice signal 38 to a digital voice signal 40. The voice capture unit 12 outputs the digital voice signal 40 to the voice encoder 16. An analog video (image) signal 42 is input to the image capture unit 14 from a camera 80 (FIG. 3). The image capture unit 14 includes an A/D converter circuit (not shown) to convert the analog video signal 42 to digital video data 44. The digital video data is referred to as "video data" or "image data" in the following description. The image capture unit 14 outputs the image data 44 to the LCD controller 34 and the data selector 18. The LCD controller 34 creates a three-primary-color image signal 46. The three primary colors are red, green and blue. The LCD controller 34 causes a liquid crystal monitor or panel 86 (FIG. 3) to display a desired image based on the image signal 46.

The voice encoder 16 includes an encoder circuit to apply a compression process on the digital voice signal 40. The voice encoder 16 outputs the compressed (encoded) voice data 48 to the synchronization processor 24.

The data selector 18 has two selection switches SW1 and SW2 in this embodiment. The first selection switch SW1 is a switch to select or determine the origin or source of the image data. The first selection switch SW1 is connected to an output of the video capture unit 14 at a terminal "a". The video data 44 is supplied to the terminal "a". The first selection switch SW1 is connected to an output of the character visage extractor/synthesizer 20 at a terminal "b". Character image data 50 is supplied to the terminal "b". The character image is created three-dimensionally. The first selection switch SW1 is connected to the image encoder 22 at a terminal "c" so that the selected image data is provided to the image encoder 22. The second selection switch SW2 is a switch to determine whether the image data 44 should be introduced to the character visage extractor/synthesizer 20. The character visage extractor/synthesizer 20 receives the image data 44a which has passed through the second selection switch SW2, when the second selection switch SW2 is turned on.

A selection signal 52 is input to the data selector 18 from a system controller (not shown). When the character image data 50 is sent to the image encoder 22, the second selection switch SW2 is turned on and the first selection switch SW1 is connected to the terminal "b". Therefore, the first and second switches SW1 and SW2 are operated in synchronization with the selection signal 52.

Figure 2:
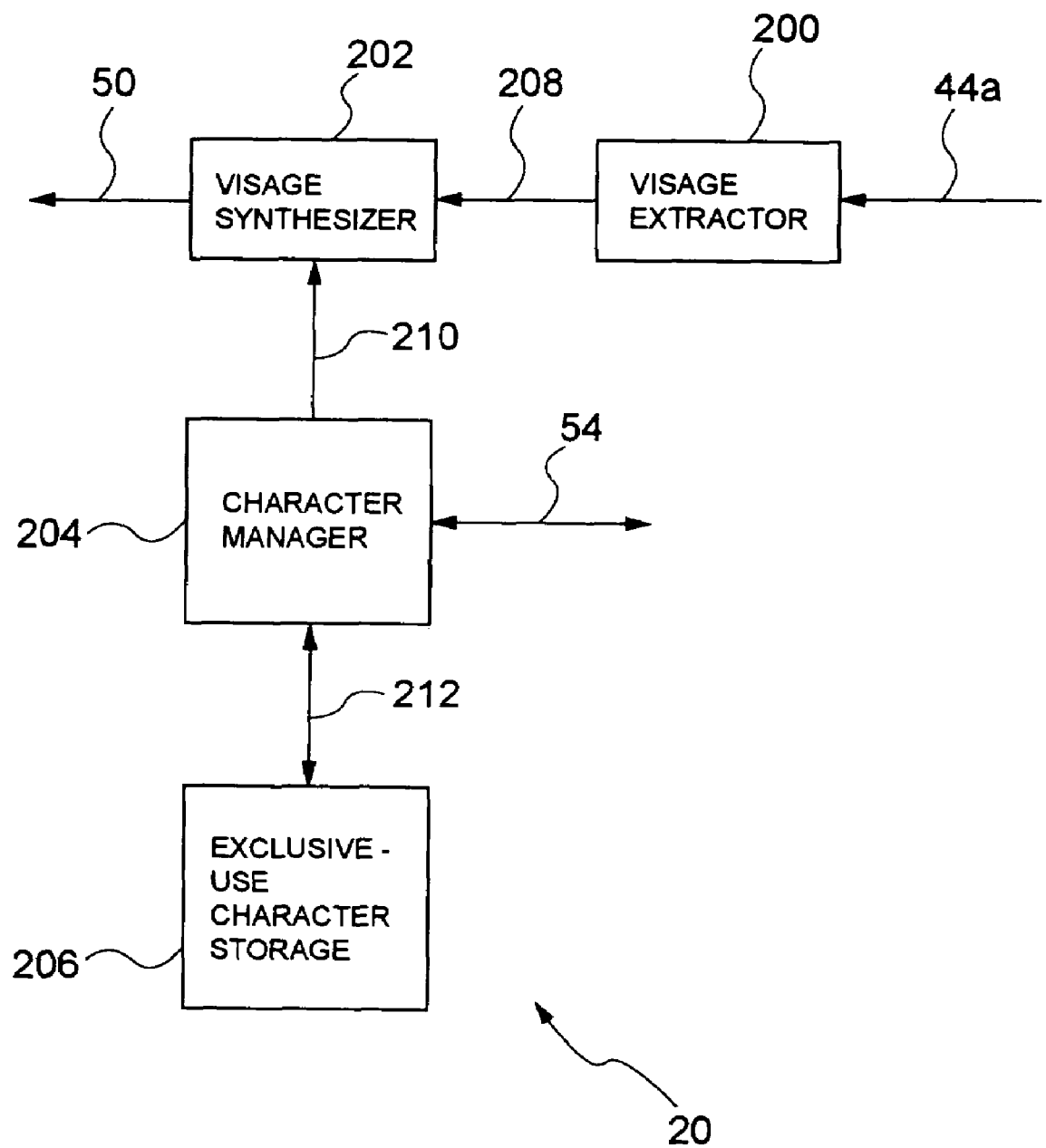
FIG. 2 illustrates a block diagram of a character visage extractor included in the signal processing unit shown in FIG. 1.

Referring to FIG. 2, the character visage extracting/synthesizing unit 20 includes a visage extractor 200, a visage synthesizer 202, a character manager 204 and an exclusive-use character storage 206. The image data 44 (44a) includes an image of a user's face and a surrounding image. The visage extractor 200 focuses on the image (or area) of the user's face present in the image data 44a to extract characterizing portions (or positions) of the user's face. The characterizing portions are then used to prepare visage data. The visage extractor 200 sends the visage data 208 to the visage synthesizer 202.

After sending the first visage data to the visage synthesizer 202, the visage extractor 200 may not send the next visage data. Instead, the visage extractor 200 may prepare visage difference data based on a difference between the first visage data and current visage data and send the visage difference data to the visage synthesizer 202. By doing so, it is possible to reduce an amount of data to be sent to the visage synthesizer 202.

The visage synthesizer 202 includes an arithmetic unit (not shown) to calculate position changes made to the characterizing portions of the character image data 210 based on the visage data 208. The character image data 210 is selected by the user of the cellular phone 100. The visage synthesizer 202 also includes a rendering unit (not shown) to place a polygon on the modified character image thereby attaching the polygon to a new face bone (skeleton) represented by the modified character image. In this manner, the visage synthesizer 202 creates character image data 50. The character image data 50 represents an image of three-dimensional, somewhat-modified visage, which is prepared from the single image data.

The character manager 204 performs read/write control on the exclusive-use character storage 206. The character manager 204 manages information about the character image, a user of the character image (e.g., identification of the user of the cellular phone 100), registration, authentication in response to an access from the cellular phone 100, licensing permission/refusal, permitted time of use, elapsed time of use for a currently used character, a total time of use, charging, payment, and the like. The character manager 204 can select and replace a character on the basis of a command from an operation unit.

The character manager 204 sends and receives the data 54 to and from the transmitter/receiver 26. When receiving the data 54, the character manager 204 takes the character image data from the data 54. In other words, the character manager 204 downloads the character image data as incoming data. When transmitting the data 54, the character manager 204 outputs the data about the use of the character as the outgoing data. In other words, the character manager 204 uploads the data of usage to, for example, an ASP (Access Signaling Protocol) server via the incoming/outgoing data processor 26.

The ASP server is a device that causes a gateway to operate in accordance with a protocol supported by equipment on an IP (Internet protocol) network.

The exclusive-use character storage 206 is a memory. The exclusive-use character storage 206 stores the character image data downloaded via a signal line 212 in accordance with a write command from the character manager 204, under the control of the character manager 204. The exclusive-use character storage 206 outputs the character image data selected in response to a read command from the character manager 204, under the control of the character manager 204. The exclusive-use character storage 206 stores a plurality of favorite characters of a user.

Referring back to FIG. 1, the image encoder 22 accepts one incoming image data, i.e., either the image data 44 or the character image data 50. The image encoder 22 then applies the compression (encoding) process on the incoming image data. The image encoder 22 outputs the encoded image data 56 to the synchronization unit 24. The image encoder 22 can apply the encoding process to any image data supplied from the data selector 18. Thus, only one encoder is needed in this embodiment.

The synchronization unit 24 receives the voice data 48 and the image data 56, and outputs transmission data 58, which includes the synchronized voice and image data, to the transmission/reception data processor 26. Since the voice and image data are synchronized, a communication device on a receiving side can display an image (moving picture) that matches a voice. Particularly, movements of a speaker's mouth displayed on a screen match the voice uttered from a speaker set. This assures communication quality.

The transmission/reception data processor 26 packets the data 58 and 54 in a predetermined format, and sends the packet data to a base station (not shown) via an electric wave 60 having a prescribed frequency. When receiving data, the transmission/reception data processor 26 receives the electric wave 60 from the base station, and applies a depacketing process on the incoming data to divide the incoming data into the image data 62 and the voice data 64. The transmission/reception data processor 26 then supplies the image data 62 to the image decoder 28 and the voice data 64 to the voice decoder 30. As described above, the data transmission/reception processor 26 supplies the character data 54, which is downloaded from the ASP server, to the character visage extractor/synthesizer 20.

The image decoder 28 includes a circuit to apply an expansion (decoding) process on the image data 62. The image data 62 maybe image data of a face of a remote party, or character image data selected by the remote party. The image decoder 28 outputs the decoded image data 66 to the synchronization unit 32. The voice decoder 30 includes a circuit to apply an expansion (decoding) process on the voice data 64. The voice decoder 30 supplies the decoded voice data 68 to the synchronization unit 32.

The synchronization unit 32 includes a synchronization circuit to synchronize the image data 66 with the voice data 68, and an A/D converter to convert the voice data 68 to an analog signal. Therefore, it is possible to generate a voice that matches the speaker's face (i.e., remote party's face) when the display unit displays the speaker's face on the screen. The synchronization unit 32 supplies the synchronized image data 70 and voice signal 72 to the LCD controller 34 and output amplifier 36 respectively.

The LCD controller 34 is a circuit to receive the incoming image data and cause the LCD monitor to display an image based on the incoming image data. In this embodiment, three image data 44, 50 and 70 are the incoming data to the LCD controller 34. The LCD controller 34 prepares the same size of image for the image data 44 and 50 and a larger size of image for the image data 70. Accordingly, the LCD monitor 86 (FIG. 3) displays the image of the remote party, together with the image of the user (real face of the user) of the cellular phone 100 and the user's character image transmitted to the remote party. The signal processor 10 allows the user of the cellular phone 100 to see how the user's image sent to the receiving person looks.

The output amplifier 36 is an amplifier circuit to amplify the voice signal 72. The output amplifier 36 outputs an amplified voice signal 74 to a speaker 88 (FIG. 3).

As described above, the cellular phone 100 can select the image to be sent, i.e., either the character image or the user's face image (real image). In other words, the face of the user of the cellular phone 100 can be hidden. Instead, the user will send the character image. Therefore, the user of the cellular phone 100 is encouraged to communicate with more people. This improves the serviceability of the cellular phone 100.

It should be noted that the synchronization units 24 and 32 may be dispensed with, if no problem would occur with respect to the synchronization between the voice and image. In this case, however, the A/D converter included in the synchronization unit 32 will be placed upstream of the amplifier 36 to convert the voice data 68 to the analog signal 72 because the analog signal should be fed to the output amplifier 36.

Now, an operation of the cellular phone 100 will be described with reference to FIGS. 1 and 3. As shown in FIG. 3, the cellular phone 100 include the camera 80, microphone 82, a key operation unit 84, LCD monitor 86 and speaker 88 on the front face of the cellular phone 100. This arrangement allows the user to capture a sample image and voice from the same direction (i.e., from the front face of the cellular phone 100). The camera 80 can photograph the user of the cellular phone 100. The camera 80 sends an incident light beam to a two-dimensional solid-state photographing element (not shown) via an optical lens 80a to convert the incident light beam to an electrical signal. The resulting electrical signal is the photograph signal 42 (FIG. 1) provided to the image capture unit 14.

Returning to FIG. 3, the microphone 82 is a device to convert a sound in the vicinity of the cellular phone 100 into the analog voice signal 38. The analog voice signal 38 is fed to the voice capture unit 12. The voice capture unit 12 and image capture unit 14 digitize the analog voice signal 38 and the picture signal 42 respectively so that the voice data 40 and the image data 44 are captured. The image data 44 is also input to the LCD controller 34.

The control panel portion 84 has a plurality of keys to select the type of data entry language, such as English, Hiragana (Japanese character), Katakana (Japanese character) and number. The control panel portion 84 also has a joystick or trackball. One of the keys of the control panel portion 84 sends an image selection command to a system controller (not shown) when it is pressed. The system controller issues the switch command 52 to the data selector 18 when the system controller receives the image selection command.

Upon receiving the switch command 52, the data selector 18 switches the image data source between the real face image and the character image, and at the same time determines whether the image data 44 should be transmitted (passed) or not. In other words, the data selector 18 selects one of the image data 44 or the character image data 50. When the character image data 50 is selected, the image data 44 is supplied to the character visage extractor/synthesizer 20. The character visage extractor/synthesizer 20 creates the character image data 50, which is prepared based on the user's face, and sends the character image data 50 to the data selector 18 and the LCD controller 34.

The synchronization unit 24, which is utilized when transmitting the data to a remote cellular phone, causes the voice data 48 to synchronize with the image data 56. The synchronized voice and image data 58 (i.e., transmission data) are then supplied to the transmission/reception data processor 26. The transmission/reception data processor 26 transmits the data 60 to the remote cellular phone.

When the cellular phone 10 receives data from a remote cellular phone, the transmission/reception data processor 26 separates the compressed (encoded) image data 62 from the voice data 64, and supplies the image data 62 to the image decoder 28 and the voice data 64 to the voice decoder 30. The image data 62 from the remote cellular phone is decoded (expanded) in the image decoder 28, and the resulting image data 66 undergoes the synchronization process in the synchronization unit. 32. The synchronized image data 70 is introduced to the LCD controller 34.

The LCD controller 34 processes the three image data 44, 50 and 70 such that the image data 44, 50 and 70 are displayed in three regions 86a, 86b and 86c respectively on the LCD monitor 86. When the image data 44 is selected by the data selector 18, the region 86b displays the same image as the region 86a. In such a case, one of the regions 86a and 86b may be used to show another image or information. It should be noted that the locations and sizes of the regions 86a to 86c are not limited to those illustrated. It should also be noted that the LCD monitor 86 may be divided into two, four or more regions.

Since the image switching operation made on the cellular phone 100 causes the signal processor 10 to switch the outgoing image between the real face image and the character image, the user can hide the user's real face when talking to the remote party. Thus, it is possible to maintain the privacy of the user of the cellular phone 100.

Figure 4:
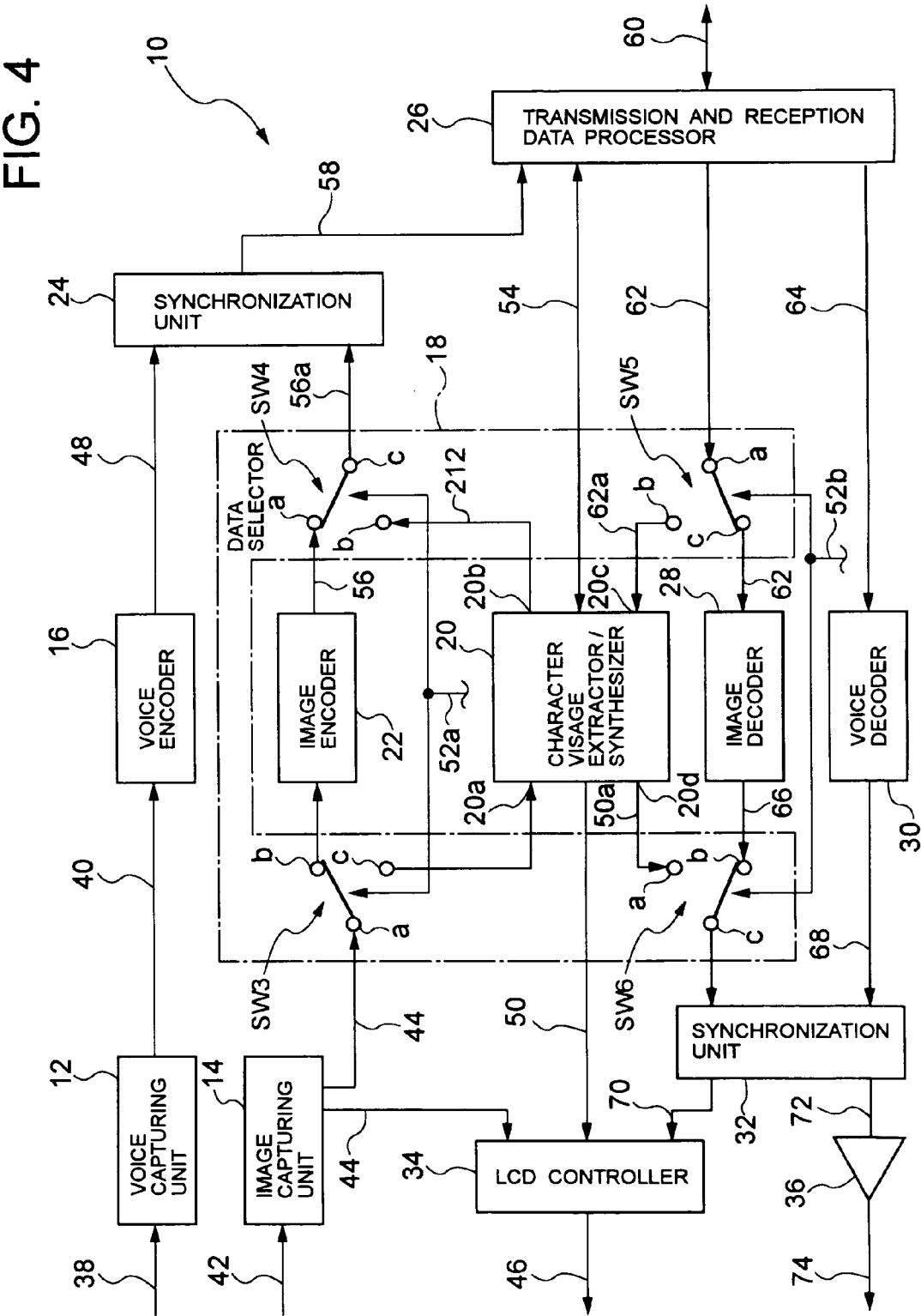
FIG. 4 illustrates a block diagram of a signal processing unit according to a second embodiment of the present invention.
Figure 5:
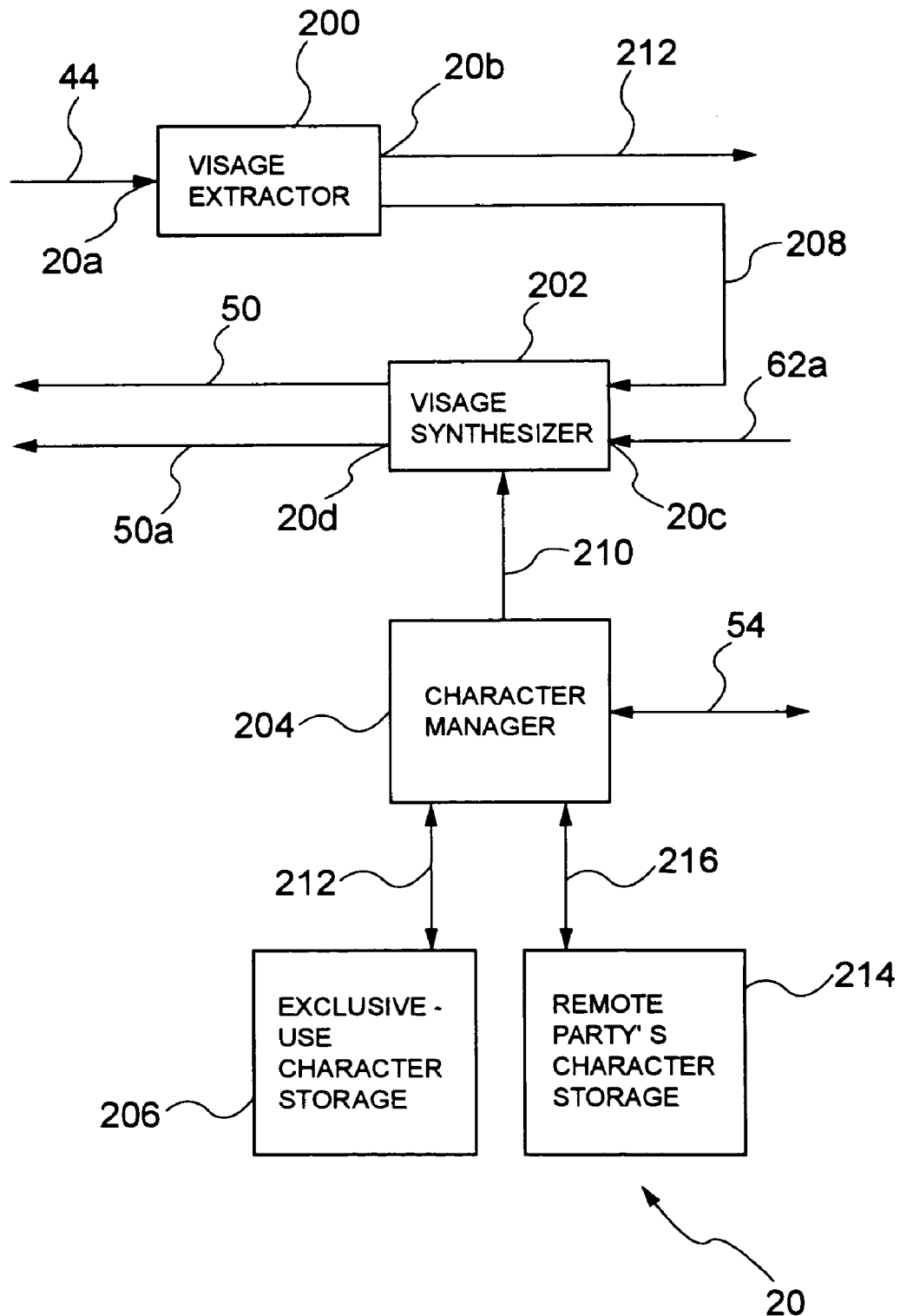
FIG. 5 illustrates a block diagram of a character visage extractor in the signal processing unit shown in FIG. 4.

A second embodiment of the present invention will be described with reference to FIGS. 4 and 5. Similar reference numerals are used to designate similar elements in the first embodiment (FIGS. 1 to 3) and the second embodiment (FIGS. 4 and 5) and description of such elements is omitted. The data selector 18 and the character visage extractor/synthesizer 20 in the second embodiment are different the first embodiment.

The data selector 18 includes four selection switches SW3, SW4, SW5 and SW6. The selection switch SW3 is a switch to determine the destination of the image data 44. The selection switch SW4 determines the origin of image data 56a, which is introduced to the synchronization unit 24. The selection switch SW3 is connected to the image capture unit 14 at a terminal "a", connected to the image encoder 22 at a terminal "b", and connected to an input 20a of the character visage extractor/synthesizer 20 at a terminal "c". The selection switch SW4 is connected to the image encoder 22 at a terminal "a", connected to an output 20b of the character visage extractor/synthesizer 20 at a terminal "b", and connected to the synchronization unit 24 at a terminal "c". The selection switches SW3 and SW4 are switched synchronously in the same direction in response to a switch command 52a. The character visage extractor/synthesizer 20 outputs visage data 212 to the selection switch SW4 from the output 20b.

Since the signal processor 10 of this embodiment has the above described structure, the cellular phone 100 can issue the visage data from the character visage extractor/synthesizer 20 after compressing (encoding).

The selection switches SW5 and SW6 are used when receiving data from a remote cellular phone. Like the selection switches SW3 and SW4, the selection switches SW5 and SW6 determine the destination and origin of the image data. The selection switch SW5 receives image data or visage data from the transmission/reception data processor 26 at a terminal "a". The image data includes the character image data. The selection switch SW5 is connected to an input 20c of the character visage extractor/synthesizer 20 at a terminal "b", and connected to the image decoder 28 at a terminal "c". Visage data 62a is introduced to the character visage extractor/synthesizer 20 from a terminal "b" of the selection switch SW5.

The selection switch SW6 is connected to an output 20d of the character visage extractor/synthesizer 20 at a terminal "a" and connected to the image decoder 28 at a terminal "b". The character visage extractor/synthesizer 20 and the image decoder 28 are the origins of the image data.

The selection switches SW5 and SW6 are switched synchronously in the same direction in response to a switch command 52b. The character visage extractor/synthesizer 20 therefore creates the three-dimensional character image data 50a in accordance with a character specified (designated) by a remote cellular phone user, and outputs the image data 50a to the terminal "a" of the selection switch SW6.

As the data selector 18 performs the switching (selecting) operation as described above, one of the three-dimensional character image data 50a prepared based on the visage data, the conventional image data (real face data) and the character image data prepared by the remote cellular phone user is fed to the synchronization unit 32. The synchronization unit 32 causes the image data supplied from the selection switch SW6 to synchronize with the voice data 68, and outputs the resulting image data 70 to the LCD controller 34. As described above, the LCD controller 34 also receives the three-dimensional character image data 50, prepared on the basis of the real face of the user of the cellular phone 100, from the character visage extractor/synthesizer 20. The LCD controller 34 displays the three image data 44, 50 and 70 in the three regions on the LCD monitor, like the first embodiment.

The structure of the character visage extractor/synthesizer 20 is described with reference to FIG. 5.

Fundamentally, the character visage extractor/synthesizer 20 has the same structure as the character visage extractor/synthesizer 20 shown in FIG. 2. The difference lies in that a storage 214 is additionally provided for storing a character of the remote cellular phone user. Similar reference numerals are used to designate similar elements in FIGS. 2 and 5.

The remote phone user's character storage 214 is a memory similar to the exclusive-use character storage 206. The exclusive-use character storage 206 is a character storage for the user of the cellular phone 100. The remote phone user's character storage 214 stores the character image data specified by the remote phone user beforehand under the control of the character manager 204. If the remote phone user's character storage 214 does not hold the character image data, the cellular phone 100 requests the ASP server connected to the external IP network (not shown) to send a corresponding character to the cellular phone 100, as in the first embodiment.

The ASP server first checks the status and history of the cellular phone 100 (or the user thereof) with respect to the requested character (e.g., whether a registration has been made for use of this character, whether the cellular phone user has paid appropriately in response to invoices, and how many hours the cellular phone user has used the character), and determines authentication (i.e., whether use of the character image should be permitted this time, or registration should be accepted if the request is made for the first time). If use of the character image is permitted, the character image data is downloaded to the cellular phone 100 from the ASP server. In this manner, the desired character image data is supplied to the character manager 204 via the signal line 54 of the signal processor 10. The character manager 204 causes the remote phone user's character storage 214 to store the character image data. The character manager 204 also controls (manages) the exclusive-use character storage 206 so that desired character image data is stored therein.

Now, an operation of the character visage extractor/synthesizer 20 will be described. Upon receiving the image data 44, the visage extractor 200 extracts characterizing portions (positions) of the face image. The characterizing portions are used to define the visage of the face. The extracted visage data is output as visage data 208 and 212 from the visage extractor 200. The visage data 208 is input to the visage synthesizer 202. Visage data 62a from a remote phone user is also input to the visage synthesizer 202. When ordinary image data (i.e., image not modified) is transmitted instead of the character image, the terminal "b" of the selection switch SW3 is selected. In this case, the character visage synthesizer 202 does not create the modified image (character image).

When the terminal "c" of the selection switch SW3 is selected, the cellular phone 100 transmits the visage data 212 to the remote phone via the terminal "b" of the selection switch SW4. The character image is read from the exclusive-use character storage 206, which is selected by the user of the cellular phone 100. The character image is then supplied to the visage synthesizer 202 via the character manager 204. The visage synthesizer 202 creates the character image data 50 from the three-dimensional character image, which is selected by the user of the cellular phone 100, by modifying the three-dimensional character image in accordance with the visage data 208. The visage synthesizer 202 outputs the character image data 50 to the LCD controller 34.

If the terminal "c" of the selection switch SW5 is selected, the visage data 62*a* is not supplied to the visage synthesizer 202. If the terminal "b" of the selection switch SW5 is selected, the visage data 62*a* is introduced to the input 20*c* of the visage synthesizer 202. Then the character manager 204 retrieves character image data 216, which a remote phone user wants to use, from the remote phone user character storage 214. The character manager 204 supplies the character image data 216 to the visage synthesizer 202.

The visage synthesizer 202 utilizes the visage data 62*a* to modify the character image data 216, i.e., change the characterizing portions of the remote phone user's face, to perform the rendering. As a result, three-dimensional character image data 50*a* is created in the visage synthesizer 202. The character image data 50*a* is supplied to the terminal "a" of the selection switch SW6 from the visage synthesizer 202.

As described above, the visage data 208 and/or 62*a* is introduced to the visage synthesizer 202 in accordance with the selection(s) made by the individual(s). The three-dimensional character image data 50 and 50*a* corresponding to the display data 208 and 62*a* are therefore displayed on the LCD monitor. Even if the display data 62*a* is not supplied to the cellular phone 100 from the remote phone user, it is possible to display the three-dimensional character image on the LCD monitor of the cellular phone 100 as long as the three-dimensional character image data 62 is supplied to the cellular phone 100. The image data 62 itself is shown on the LCD monitor.

Figure 6:
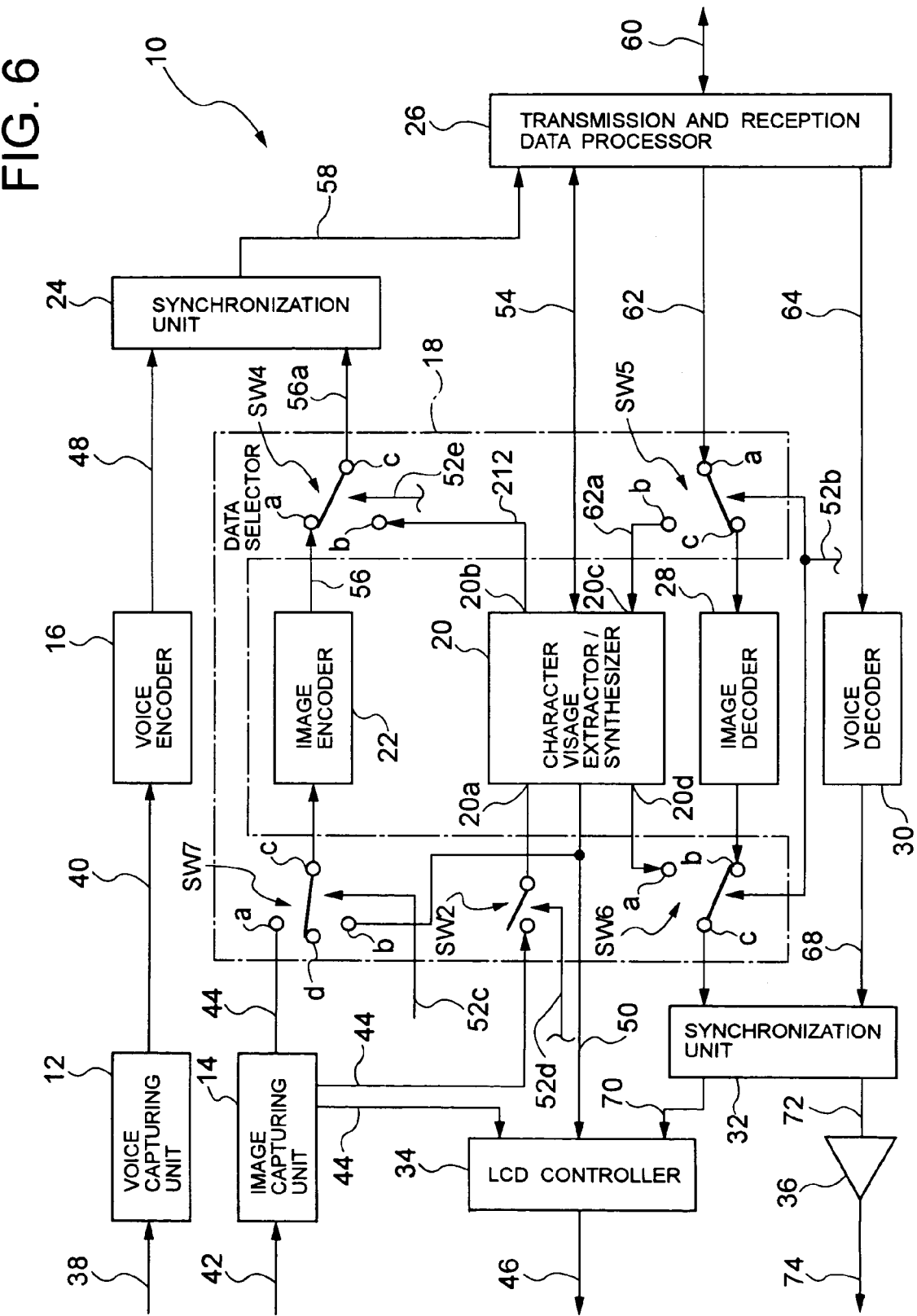
FIG. 6 illustrates a block diagram of a signal processing unit according to a third embodiment of the present invention.

It should be noted that the first and second embodiments can be combined with each other. FIG. 6 illustrates a third embodiment which is a combination of the first and second embodiments. Similar reference numerals are used in the first, second and third embodiments to designate similar elements.

In FIG. 6, the data selector 18 has selection switches SW2, SW4, SW5, SW6 and SW7. The connections between the selection switches are the same as in the first and second embodiments so that the connections are not described here. The selection switches SW5 and SW6 are the same as those described in the second embodiment.

The third embodiment is different from the foregoing embodiments in that the selection switches SW2, SW4 and SW7 are switched differently. Specifically, the selection switches SW2, SW4 and SW7 are switched independently. A switch command 52*c* is supplied to the selection switch SW7, a switch command 52*d* is supplied to the selection switch SW2, and a switch command 52*e* is supplied to the selection switch SW4. The selection switch SW7 in FIG. 6 corresponds to the selection switch SW1 in FIG. 1. However, the selection switch SW7 has a neutral terminal "d" to select neither the image data 44 nor the three-dimensional character image data 50. Since the selection switch SW7 has the neutral terminal, the cellular phone 100 can have an open state, which selects nothing. The switch commands 52*c*, 52*d* and 52*e* will be described below.

When the cellular phone 100 captures the user's face image and transmits the user's face image to a remote phone user, the selection switch SW7 is connected to the terminal "a", the selection switch SW2 is opened and the selection switch SW4 is connected to the terminal "a". When the cellular phone 100 transmits three-dimensional character image data, which represents an artificial image prepared from the real face image of the user, the selection switch SW7 is connected to the terminal "b", the selection switch SW2 is closed and the selection switch SW4 is connected to the terminal "a".

When the cellular phone 100 captures the user's face image and prepares the visage data 212 from the user's face image to transmit the visage data 212, the selection switch SW7 is connected to the terminal "d" to establish the open condition, the selection switch SW2 is closed, and the selection switch SW4 is connected to the terminal "b". As a result, the visage data 212 is sent to the remote party. FIG. 6 shows the selection switch SW7 connected to the neutral position "d".

As described above, the switches can be independently switched over in the data selector 18 so that one of the three data, i.e., the captured user's face data, the three-dimensional character image data or the visage data, is transmitted to the remote party.

When receiving the data from the remote party, the cellular phone 100 can communicate with any conventional devices (e.g., terminal devices that only send a real face image, and terminal devices that only send visage data). The cellular phone 100 is only required to distinguish between the visage data and the real face data. Since the cellular phone 100 does not limit the type of the remote phone, the cellular phone 100 can communicate with a variety of remote parties. This improves the communication service provided to the user of the cellular phone 100.

It should be noted that the present invention is not limited to the cellular phone 100. The present invention is of course applicable to a wire telephone or communication devices. For example, the present invention can be applied to a computer connected to a network such as the Internet. It should also be noted that modules for compressing and expanding image data may be dispensed with if the visage data for the character is only handled. Likewise, the remote party is not limited to a cellular phone. The remote party may be a wire telephone or a computer.

In the above described embodiments, the selection switches are switched over to encode the image data so that the cellular phone 100 can communicate with a remote device that can receive the captured user's face image only and communicate with a remote device that can receive three-dimensional character image data only.

It is also possible to perform the communication using the three-dimensional character image data by transmitting the visage data or a character selection command determining which character should be used, to the remote terminal from the cellular phone 100, if the remote terminal is able to recognize the character selection command. This reduces elements to be provided in the cellular phone 100. In addition, since the visage data or the character selection command is only transmitted, a quantity of data transmission is greatly reduced, as compared with a case where the three-dimensional character image data is compressed (encoded) and transmitted. Accordingly, an expense needed to transmit the image data is suppressed.

The cellular phone 100 selects either the image data or the visage data on the basis of individual transmission conditions determined by the user, and transmits the selected data to a remote terminal user. The cellular phone 100 receives the image data in accordance with conditions determined by the remote terminal user. Thus, the cellular phone 100 can communicate with any kind of existing communication devices. By selecting a certain condition, it is possible to reduce a communication fee.

What is claimed is:

1. A communication terminal device comprising:
   a capture unit for capturing first image data which includes a face image;
   an extractor for extracting characterizing portions from the face image to obtain visage information;
   an image synthesizer for modifying second image data, which is selected by a user of the communication terminal device, based on the visage information, thereby creating third image data;
   a data selector for selecting one of the first and third image data;
   a transmission unit for transmitting the selected image data to a remote party; and
   a transfer unit for transferring at least one of the first and third image data to an element of the communication terminal device,
   wherein the data selector includes a first selector for selecting one of the first and third image data to send the selected image data to the remote party, and a second selector for selecting the first image data to provide the first image data to the extractor, and
   wherein selection of the third image data made by the first selector takes place in synchronization with providing of the first image data performed by the second selector.

2. A communication terminal device comprising:
   a capture unit for capturing first image data which includes a face image;
   an extractor for extracting characterizing portions from the face image to obtain visage information;
   an image synthesizer for modifying second image data, which is selected by a user of the communication terminal device, based on the visage information, thereby creating third image data;
   a data selector for selecting one of the first and third image data;
   a transmission unit for transmitting the selected image data to a remote party;
   a transfer unit for transferring at least one of the first and third image data to an element of the communication terminal device; and
   a reception unit for receiving incoming data from the remote party, wherein the image synthesizer creates fourth image data based on a face image of the remote party, visage information of the remote party and fifth image data selected by the remote party,
   wherein the data selector includes a third selector for determining the element to which the first image data is transferred, a fourth selector for selecting one of the first image data and visage information, a fifth selector for determining a destination of the incoming data based on whether the incoming data is the face image of the remote party, the visage information of the remote party or the fifth image data, and a sixth selector for passing the incoming data to the destination from the fifth selector or passing the fourth image data, and
   wherein the third and fourth selectors are operated synchronously and the fifth and sixth selectors are operated synchronously.

3. The communication terminal device according to claim 2 further including a display unit for displaying on a single screen the first and third image data together with one of the face image of the remote party, the fifth image data and the fourth image data.

4. The communication terminal device according to claim 2, wherein the image synthesizer includes a synthesis manager to manage information about use of the second image data, and a first memory for storing the second image data.

5. The communication terminal device according to claim 4, wherein the image synthesizer further includes a second memory for storing the fifth image data, and the synthesis manager modifies the fifth image data supplied from the second memory based on the visage information of the remote party to create the fourth image data.

6. The communication terminal device according to claim 5, wherein the synthesis manager manages the second memory in accordance with a fifth image data selection command sent from the remote party, and
   wherein if desired fifth image data, which is specified by the fifth image data selection command, does not exist in the second memory, the synthesis manager accesses an external device to download the desired fifth image data from the external device.

7. The communication terminal device according to claim 6, wherein the synthesis manager manages the desired fifth image data, information of the user of the communication terminal device, registration, authentication, permission of use of the desired fifth image data, permitted time for the desired fifth image data, elapsed time of use for permitted fifth image data, total time of use, charging and payment, while the synthesis manager is accessing the external device.

8. A communication terminal device comprising:
   a capture unit for capturing first image data which includes a face image;
   an extractor for extracting characterizing portions from the face image to obtain visage information;
   an image synthesizer for modifying second image data, which is selected by a user of the communication terminal device, based on the visage information, thereby creating third image data;
   a data selector for selecting one of the first and third image data;
   a transmission unit for transmitting the selected image data to a remote party; and
   a transfer unit for transferring at least one of the first and third image data to an element of the communication terminal device,
   wherein the image synthesizer creates fourth image data based on a face image of the remote party, visage information of the remote party and fifth image data selected by the remote party,
   wherein the data selector includes a seventh selector for selecting one of the first image data, the third image data and a neutral condition, a second selector for passing the first image data to the extractor, a fourth selector for selecting one of the image data selected by the seventh selector and the visage information, a fifth selector for determining a destination of incoming data based on whether the incoming data is the face image of the remote party, the visage information of the remote party or the fifth image data, and a sixth selector for passing the incoming data to the destination from the fifth selector or passing the fourth image data, and
   wherein the fifth and sixth selectors are operated synchronously and the first and fourth selectors are operated independently.

9. The communication terminal device according to claim 8 further including a display unit for displaying on a single screen the first and third image data together with one of the face image of the remote party, the fifth image data and the fourth image data.

10. The communication terminal device according to claim 8, wherein the image synthesizer includes a synthesis manager to manage information about use of the second image data, and a first memory for storing the second image data.

11. The communication terminal device according to claim 10, wherein the image synthesizer further includes a second memory for storing the fifth image data, and the synthesis manager modifies the fifth image data supplied from the second memory based on the visage information of the remote party to create the fourth image data.

12. The communication terminal device according to claim 11, wherein the synthesis manager manages the second memory in accordance with a fifth image data selection command sent from the remote party, and wherein if desired fifth image data, which is specified by the fifth image data selection command, does not exist in the second memory, the synthesis manager accesses an external device to download the desired fifth image data from the external device.

13. The communication terminal device according to claim 12, wherein the synthesis manager manages the desired fifth image data, information of the user of the communication terminal device, registration, authentication, permission of use of the desired fifth image data, permitted time for the desired fifth image data, elapsed time of use for permitted fifth image data, total time of use, charging and payment, while the synthesis manager is accessing the external device.

* * * * *